United States Patent [19]
Les Strange

[11] Patent Number: 6,043,565
[45] Date of Patent: Mar. 28, 2000

[54] ENERGY CONVERSION AND STORAGE SYSTEM

[76] Inventor: Shawn Les Strange, 1350 Hampton Street, Unit #14, Oakville, Ontario, Canada, L6h 2S6

[21] Appl. No.: 09/070,574

[22] Filed: Apr. 30, 1998

[51] Int. Cl.[7] .................................................. F03D 9/00
[52] U.S. Cl. ............................................. 290/55; 290/44
[58] Field of Search ........................................ 290/44, 55

[56] References Cited

U.S. PATENT DOCUMENTS

| | | | |
|---|---|---|---|
| 2,878,743 | 11/1959 | Trunnell | 98/42 |
| 3,093,059 | 6/1963 | Metz | 98/42 |
| 3,707,812 | 1/1973 | Roessl | 52/27 |
| 4,379,972 | 4/1983 | Sosa et al. | 290/44 |
| 4,421,967 | 12/1983 | Birgel et al. | 219/10.51 |
| 4,963,761 | 10/1990 | Wight | 290/55 |
| 5,384,489 | 1/1995 | Bellac | 290/44 |
| 5,394,016 | 2/1995 | Hickey | 290/55 |
| 5,457,346 | 10/1995 | Blumberg et al. | 290/55 |
| 5,907,192 | 5/1999 | Lyons et al. | 290/44 |

*Primary Examiner*—Nicholas Ponomarenko

[57] ABSTRACT

An energy conversion and storage system is provided including a building having a roof mounted thereon. Also included is a propeller assembly mounted on the roof for generating electrical energy during the rotation of the propeller assembly. Next provided is a battery situated below a ground surface beneath the building and connected to the propeller assembly for storing energy received therefrom. A power converter is connected between the battery and an electrical system of the building for providing alternating current thereto when desired.

7 Claims, 3 Drawing Sheets

ENERGY CONVERSION AND STORAGE SYSTEM

BACKGROUND OF THE INVENTION

1. Field of the Invention

The present invention relates to ventilation systems and more particularly pertains to a new energy conversion and storage system for supplementing a conventional power source of a building.

2. Description of the Prior Art

The use of ventilation systems is known in the prior art. More specifically, ventilation systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art ventilation systems include U.S. Pat. Nos. 4,379,972; 5,384,489; 4,963,761; U.S. Des. No. 274,935; U.S. Pat. Nos. 3,093,059; and 2,878,743.

In these respects, the energy conversion and storage system according to the present invention substantially departs from the conventional concepts and designs of the prior art, and in so doing provides an apparatus primarily developed for the purpose of supplementing a conventional power source of a building.

SUMMARY OF THE INVENTION

In view of the foregoing disadvantages inherent in the known types of ventilation systems now present in the prior art, the present invention provides a new energy conversion and storage system construction wherein the same can be utilized for supplementing a conventional power source of a building.

The general purpose of the present invention, which will be described subsequently in greater detail, is to provide a new energy conversion and storage system apparatus and method which has many of the advantages of the ventilation systems mentioned heretofore and many novel features that result in a new energy conversion and storage system which is not anticipated, rendered obvious, suggested, or even implied by any of the prior art ventilation systems, either alone or in any combination thereof.

To attain this, the present invention generally comprises a building having an attic with a roof mounted thereon. A cupola is situated on the roof in communication with the attic. Preferably, the cupola includes a rectangular side wall with a plurality of downwardly extending vents mounted thereon and a beveled top. Next provided is a central shaft having a bottom end rotatably mounted to a bottom face of the cupola. As shown in FIG. 1, the central shaft further extends vertically upwards through the top of the cupola. A wind guide includes a main body having a conical configuration with a large open end and a small closed end. A plurality of rudders are mounted on the main body adjacent to the closed end. The rudders include a pair of horizontal diametrically opposed rudders and a vertically oriented top rudder mounted thereon for aligning the wind guide with a flow of wind. A hollow interior space of the main body includes an arcuate wall mounted therein at a central extent thereof. By this structure, the wind guide functions for directing air within the open end of the open body and downwardly through an opening formed in a lower surface of the main body. It should be noted that the wind guide is mounted on a top end of the central shaft at a central extent thereof. With reference still to FIG. 1, a wind tunnel has a generally cylindrical configuration with a pair of open ends. Each open end has a diameter greater than that of a central extent of the wind tunnel. As such, the ends of the wind tunnel flare outwardly. As shown in the Figures, the wind tunnel is vertically mounted on the central shaft in concentric relationship therewith. As such, a top end of the wind tunnel is in communication with the opening of the wind guide for directing air received therefrom downwardly through a bottom end of the wind tunnel. For harnessing energy from the wind, a propeller assembly is provided including a hollow shaft rotatably mounted in coaxial relationship with the central shaft. Such hollow shaft extends from the bottom end of the central shaft to a point just below the wind tunnel. The propeller assembly further includes a propeller fixedly mounted on a top end of the hollow shaft for rotating upon the receipt of wind through the wind tunnel. For generating electrical energy during the rotation of the propeller assembly, a generator is situated on a bottom end of the hollow shaft. FIG. 4 shows a ventilation fan including a spiral vane of a constant width serpentinely coupled to the hollow shaft. Preferably, the ventilation fan is situated within the cupola above vents formed in the bottom face of the cupola. As such, air is suctioned from the attic and out the side wall of the cupola for ventilation purposes. It should be noted that when hot air rises from the bottom face of the cupola, the ventilation fan further works in conjunction with the propeller to rotate the hollow shaft. For storing energy received from the generator, a battery is situated below a ground surface beneath the building and connected to the generator. A power converter is connected between the battery and an electrical system of the building for providing alternating current thereto when desired.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new energy conversion and storage system apparatus and method which has many of the advantages of the ventilation systems mentioned heretofore and many novel features that result in a new energy conversion and storage system which is not anticipated, rendered obvious, suggested, or even implied by any of the prior art ventilation systems, either alone or in any combination thereof.

It is another object of the present invention to provide a new energy conversion and storage system which may be easily and efficiently manufactured and marketed.

It is a further object of the present invention to provide a new energy conversion and storage system which is of a durable and reliable construction.

An even further object of the present invention is to provide a new energy conversion and storage system which is susceptible of a low cost of manufacture with regard to both materials and labor, and which accordingly is then susceptible of low prices of sale to the consuming public, thereby making such energy conversion and storage system economically available to the buying public.

Still yet another object of the present invention is to provide a new energy conversion and storage system which provides in the apparatuses and methods of the prior art some of the advantages thereof, while simultaneously overcoming some of the disadvantages normally associated therewith.

Still another object of the present invention is to provide a new energy conversion and storage system for supplementing a conventional power source of a building.

Even still another object of the present invention is to provide a new energy conversion and storage system that includes a building having a roof mounted thereon. Also included is a propeller assembly mounted on the roof for generating electrical energy during the rotation of the propeller assembly. Next provided is a battery situated below a ground surface beneath the building and connected to the propeller assembly for storing energy received therefrom. A power converter is connected between the battery and an electrical system of the building for providing alternating current thereto when desired.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
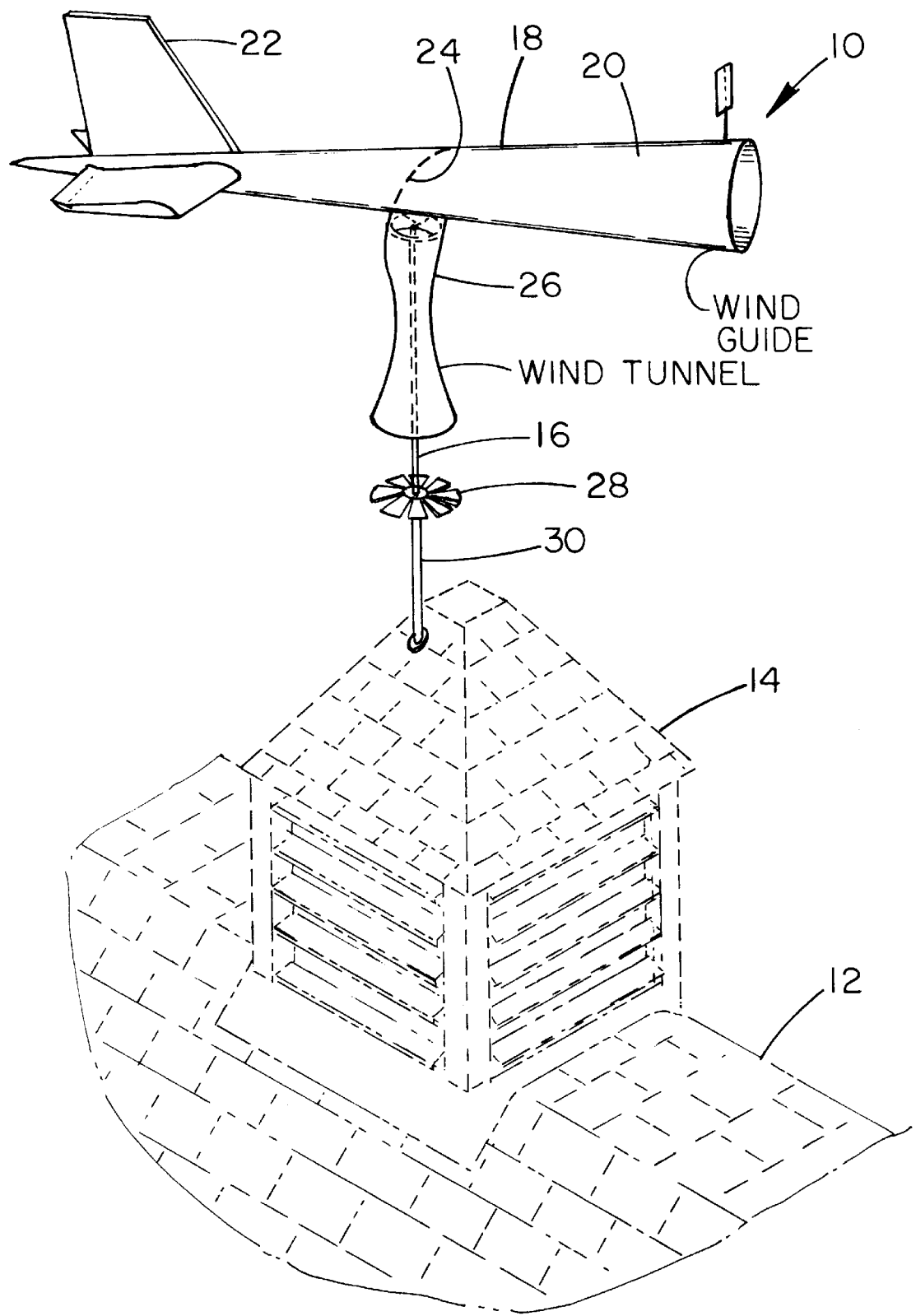
FIG. 1 is a perspective view of a new energy conversion and storage system according to the present invention.
Figure 2:
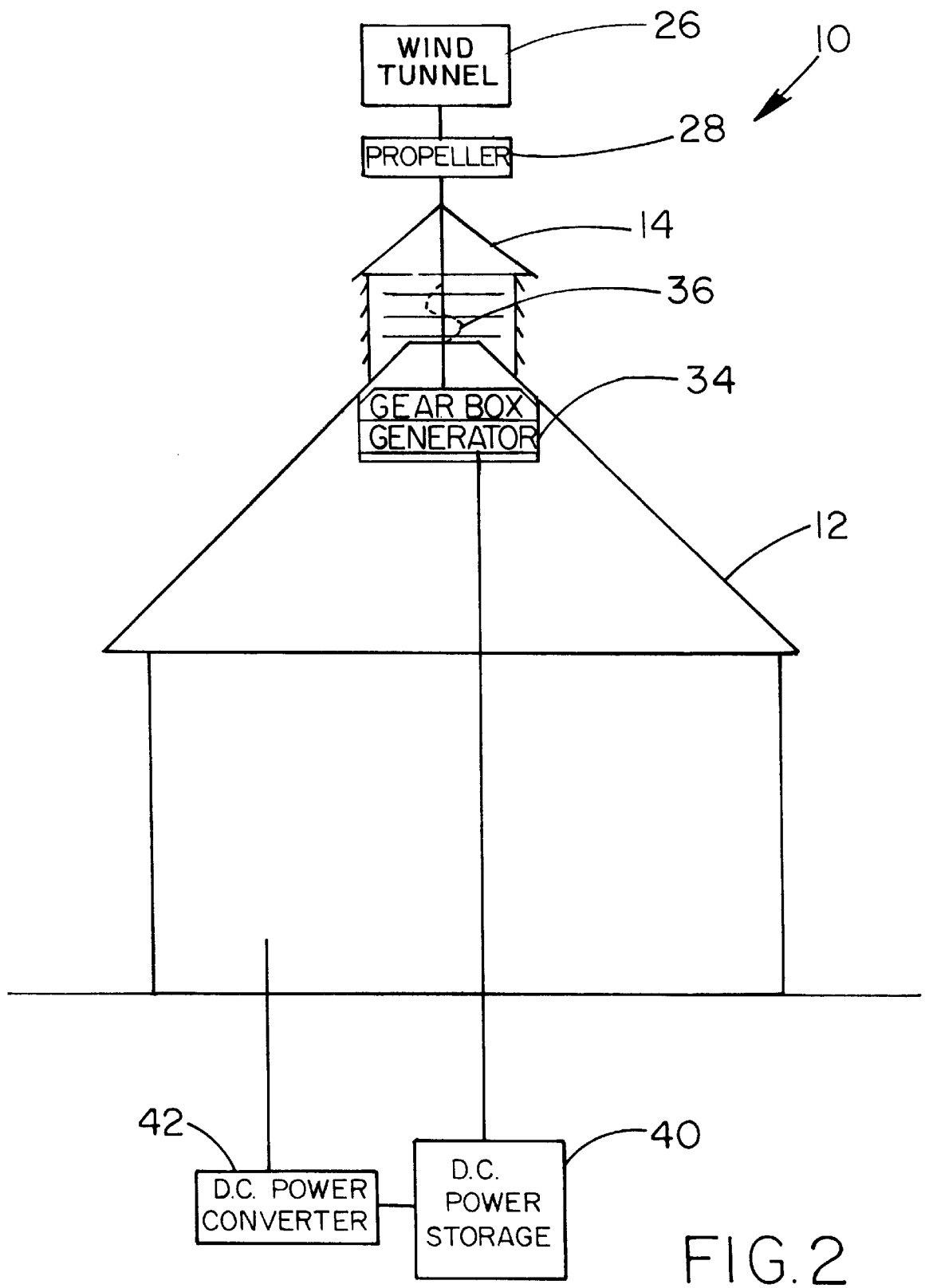
FIG. 2 is a general block diagram of the present invention.

With reference now to the drawings, and in particular to FIGS. 1 through 4 thereof, a new energy conversion and storage system embodying the principles and concepts of the present invention and generally designated by the reference numeral 10 will be described.

The present invention, designated as numeral 10, includes a building 12 having an attic with a roof mounted thereon. A cupola 14 is situated on the roof in communication with the attic. Preferably, the cupola includes a rectangular side wall with a plurality of downwardly extending vents mounted thereon and a beveled top.

Next provided is a central shaft 16 having a bottom end rotatably mounted to a bottom face of the cupola. As shown in FIG. 1, the central shaft further extends vertically upwards through the top of the cupola for reasons that will soon become apparent.

A wind guide 18 includes a main body 20 having a conical configuration with a large open end and a small closed end. A plurality of rudders 22 are mounted on the main body adjacent to the closed end. The rudders include a pair of horizontal, diametrically opposed rudders and a vertically oriented top rudder mounted thereon for aligning the wind guide with a flow of wind. As an option, a small rudder may also be mounted on the main body adjacent to the large open end thereof, as shown in FIG. 1.

A hollow interior space of the main body includes an arcuate wall 24 mounted therein at a central extent thereof. By this structure, the wind guide functions for directing air within the open end of the open body and downwardly through an opening formed in a lower surface of the main body. It should be noted that the wind guide is mounted on a top end of the central shaft. Such coupling is preferably effected at a central extent of the main body.

With reference still to FIG. 1, a wind tunnel 26 has a generally cylindrical configuration with a pair of open ends. Each open end has a diameter greater than that of a central extent of the wind tunnel. As such, the ends of the wind tunnel flare outwardly. As shown in the Figures, the wind tunnel is vertically mounted on the central shaft in concentric relationship therewith. As such, a top end of the wind tunnel is in communication with the opening of the wind guide for directing air received therefrom downwardly through a bottom end of the wind tunnel. Ideally, the wind tunnel imparts a spiraling "tornado" affect on the wind blowing therethrough. Furthermore, the wind tunnel preferably has a height of about ½ that of the central shaft.

For harnessing energy from the wind, a propeller assembly 28 is provided including a hollow shaft 30 independently rotatable with respect to the central shaft and in coaxial relationship therewith. Such hollow shaft extends from the bottom end of the central shaft to a point just below the wind tunnel. The propeller assembly further includes a propeller fixedly mounted on a top end of the hollow shaft for rotating upon the receipt of wind through the wind tunnel. For generating electrical energy during the rotation of the propeller assembly, a generator 34 with an optional gear box is situated on a bottom end of the hollow shaft.

Figure 4:
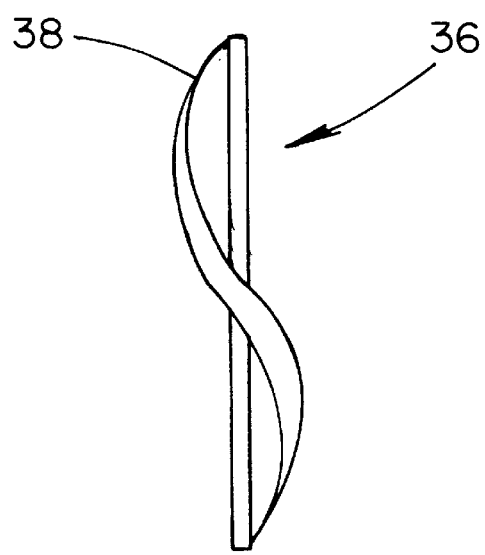
FIG. 4 is a side view of the ventilation fan of the present invention.

FIG. 4 shows a ventilation fan 36 including a spiral vane 38 of a constant width serpentincly coupled to the hollow shaft. As an option, additional vanes may be mounted on the hollow shaft. Preferably, the ventilation fan is situated within the cupola above vents formed in the bottom face of the cupola. As such, air is suctioned from the attic and out the side wall of the cupola for ventilation purposes. It should be noted that when hot air rises from the bottom face of the cupola, the ventilation fan further works in conjunction with the propeller to rotate the hollow shaft, thereby having a dual purpose.

Figure 3:
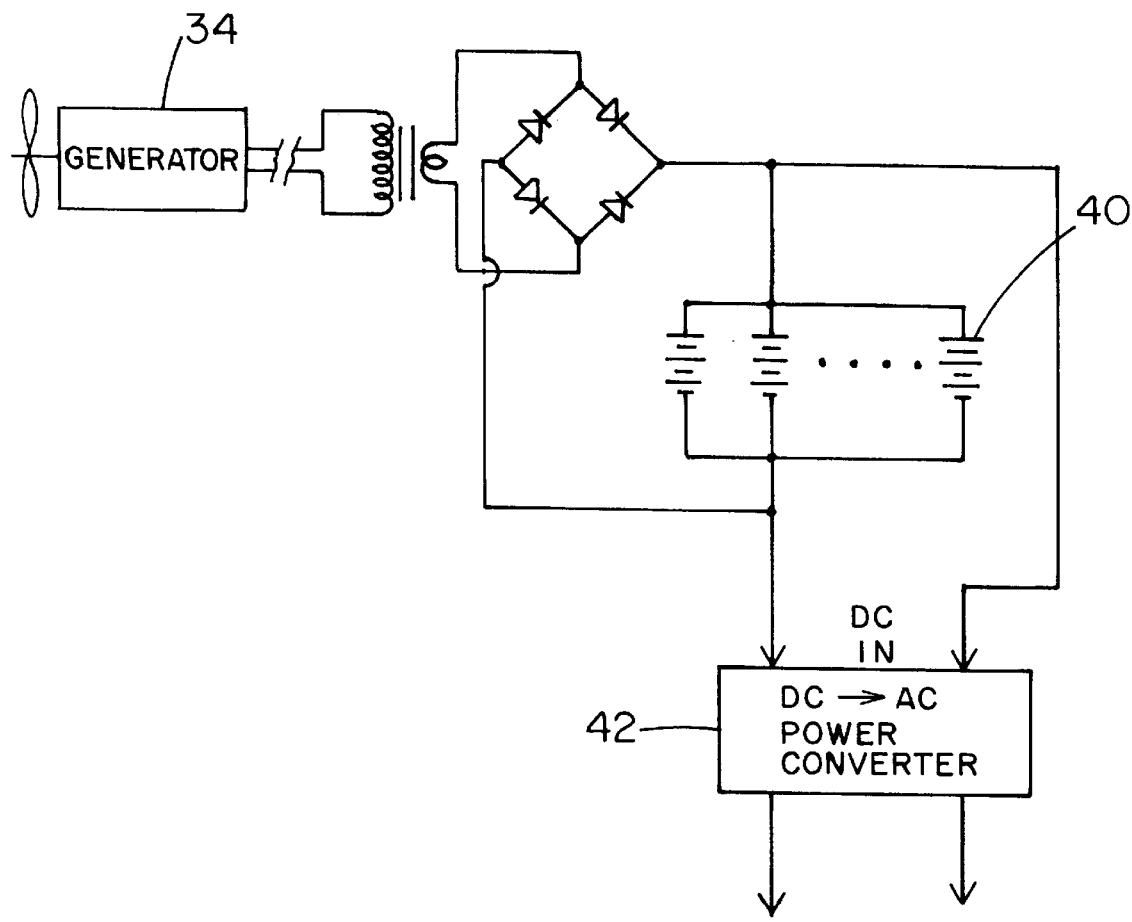
FIG. 3 is a detailed schematic diagram of the present invention.

For storing energy received from the generator, a battery 40 is situated below a ground surface beneath the building and connected to the generator. As shown in FIG. 3, a rectifier and transformer are preferably connected between the generator and the batteries to convert an alternating current generated into a direct current. Further options include a power meter to indicate to what extent the battery is charged. Finally, a power converter 42 is connected between the battery and an electrical system of the building for providing alternating current thereto when desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An energy conversion and storage system comprising, in combination:

a building having an attic with a roof mounted thereon and a cupola situated on the roof in communication with the attic, the cupola including a rectangular side wall with a plurality of downwardly extending vents mounted thereon and a beveled top;

a central shaft having a bottom end rotatably mounted to a bottom face of the cupola and extending vertically upwards through the top of the cupola;

a wind guide including a main body having a conical configuration with a large open end and a small closed end, a plurality of rudders mounted on the main body adjacent to the closed end with the rudders including a pair of horizontal diametrically opposed rudders and a vertically oriented top rudder, and a hollow interior space including an arcuate wall mounted therein at a central extent thereof for directing air flowing within the open end of the open body downwardly through an opening formed in a lower surface of the main body, wherein the wind guide is mounted on a top end of the central shaft at a central extent thereof;

a wind tunnel having a generally cylindrical configuration with a pair of open ends each having a diameter greater than that of a central extent of the wind tunnel such that the ends of the wind tunnel flare outwardly, the wind tunnel being vertically mounted on the central shaft in concentric relationship therewith such that a top end thereof is in communication with the opening of the wind guide for directing air received therefrom downwardly through a bottom end of the wind tunnel;

a propeller assembly including a hollow shaft rotatably mounted in coaxial relationship with the central shaft and extending from the bottom end of the central shaft to a point just below the wind tunnel, the propeller assembly further including a propeller fixedly mounted on a top end of the hollow shaft for rotating upon the receipt of wind through the wind tunnel, wherein a generator is situated on a bottom end of the hollow shaft for generating electrical energy during the rotation of the propeller assembly;

a ventilation fan including a spiral vane of a constant width serpentinely coupled to the hollow shaft and situated within the cupola above vents formed in the bottom face of the cupola such that air is suctioned from the attic and out the side wall of the cupola for ventilation purposes, wherein hot air rises from the bottom face of the cupola and works in conjunction with the propeller to rotate the hollow shaft;

a battery situated below a ground surface beneath the building and connected to the generator for storing energy received therefrom; and a power converter connected between the battery and an electrical system of the building for providing alternating current thereto when desired.

2. An energy conversion and storage system for mounting to a roof of a building, the energy conversion and storage system comprising:

a propeller assembly rotatable mounted on a building and operationally coupled to a generator for generating electrical energy during the rotation of the propeller assembly;

a wind guide including a main body having a conical configuration with a large open end and a small closed end, a hollow interior space including an arcuate wall mounted therein at a central extent thereof for directing air flowing into the open end of the open body downwardly through an opening formed in a lower surface of the main body, the wind guide being rotatable mounted to the roof of the building with respect to the propeller assembly for directing air to the propeller assembly;

a wind tunnel having a generally cylindrical configuration with a pair of open ends, the wind tunnel being vertically mounted to said wind guide such that a top end of the wind guide is in communication with the opening of the wind guide for directing air received from said wind guide downwardly through a bottom end of the wind tunnel wherein the propeller assembly includes a propeller positioned in said wind tunnel and rotatable independently of the wind tunnel such that air guided through said wind guide and into the wind tunnel flows past the propeller for rotating the propeller;

a battery connected to the generator for storing energy received therefrom; and a power converter connected between the battery and an electrical system of the building for providing alternating, current thereto when desired.

3. The energy conversion and storage system as set forth in claim 2 wherein the propeller assembly is mounted about a vertical axis and a wind guide directs air thereto.

4. The energy conversion and storage system as set forth in claim 2 further includes the wind guide includes at least one rudder.

5. The energy conversion and storage system as set forth in claim 2 further includes a ventilation fan rotates coincidentally with the propeller for suctioning air from an attic of the building.

6. The energy conversion and storage system as set forth in claim 2 further includes a ventilation fan works to rotate the propeller by way of heat currents from an attic of the building.

7. The energy conversion and storage system as set forth in claim 2 wherein each of the openings of the wind tunnel has a diameter greater than that of a central extent of the wind tunnel such that the ends of the wind tunnel flare outwardly.

* * * * *